United States Patent [19]

Dougherty

[11] 4,103,353
[45] Jul. 25, 1978

[54] APPARATUS FOR WORKING EXPANDABLE THERMOPLASTIC MATERIALS

[75] Inventor: Timothy Stephen Dougherty, Roswell, Ga.

[73] Assignee: Western Electric Company, Inc., New York, N.Y.

[21] Appl. No.: 721,643

[22] Filed: Sep. 8, 1976

Related U.S. Application Data

[62] Division of Ser. No. 557,728, Mar. 12, 1975, abandoned.

[51] Int. Cl.² .............................................. B29B 1/06
[52] U.S. Cl. .................................... 366/81; 366/319; 366/323
[58] Field of Search ................. 259/191, 192, 193, 97, 259/9, 10, 25, 26, 45, 46; 425/207, 208, 209; 198/661; 264/25, 53, 98

[56] References Cited

U.S. PATENT DOCUMENTS

| | | | |
|---|---|---|---|
| 2,838,794 | 6/1958 | Munger | 259/191 |
| 3,115,674 | 12/1963 | Schrenk | 259/191 |
| 3,115,675 | 12/1963 | Tedder | 259/191 |
| 3,239,883 | 3/1966 | Ferrari | 198/661 |
| 3,251,911 | 5/1966 | Hansen | 264/25 |
| 3,287,477 | 11/1966 | Vesilind | 264/53 |
| 3,391,051 | 7/1968 | Ehrenfreund | 259/191 X |
| 3,486,193 | 12/1969 | Gwinn | 425/203 |
| 3,487,503 | 1/1970 | Barr | 425/208 |
| 3,497,582 | 2/1970 | Pettersson | 264/98 |
| 3,530,534 | 9/1970 | Pomper | 425/209 |
| 3,676,034 | 7/1972 | Wendricks | 259/191 |
| 3,762,693 | 10/1973 | DeBoo | 259/191 |
| 3,822,867 | 7/1974 | Evans | 259/191 |

*Primary Examiner*—Robert W. Jenkins
*Attorney, Agent, or Firm*—E. W. Somers

[57] ABSTRACT

A typical compression relief design extruder screw having a helical flight for advancing and working a thermoplastic material is modified to shorten the feed and compression sections and to include a plurality of force-producing components in at least the compression section of the screw such that at least some portion of the components in any one turn of the flight lie in one plane essentially normal to the axis of rotation of the screw and such that the walls of the flight are uninterrupted. This arrangement controls the location of the rupturing or fragmenting of what is referred to as the solid bed and controls the manner in which it is fragmented to provide an extrudate at a die end of the extruder which has a constant temperature and and which is uniform throughout each successive section of the thermoplastic material. Further, corresponding portions of the successive sections of the thermoplastic material at the die end are caused to have substantially identical time-temperature profiles which is particularly advantageous when extruding expandable insulation in minimizing amplitude of variation in the coaxial capacitance and the diameter of the insulated conductor.

3 Claims, 8 Drawing Figures

APPARATUS FOR WORKING EXPANDABLE THERMOPLASTIC MATERIALS

This is a division, of application Ser. No. 557,728 filed Mar. 12, 1975, now abandoned.

BACKGROUND OF THE INVENTION

1. Field of the Invention

This invention relates to the advancing and working of thermoplastic materials to produce homogeneous extrudate, and, more particularly, to apparatus for advancing expandable thermoplastic materials successively through feed, compression, relief and metering zones of an extruder for producing cellular plastic insulation and jacketing materials with facilities in the compression zone which do not interrupt the helical flight of the extruder screw for maintaining a substantially uniform thermal history for successive sections of melt at an output end of the metering zone.

2. Description of the Prior Art

In the extrusion art and particularly in the extrusion of thermoplastic materials for insulating conductors for communications systems, a desire for higher line speeds necessitates higher extruder output. The output rate for an extruder is limited somewhat by the maximum rate at which extrusion can be performed while obtaining a uniform extrudate at a die end.

The thermoplastic material begins to melt along the interface with the inner surface of the extruder barrel. Once melting has begun, three distinct regions are noted in a cross section of a channel formed by a helical flight of an extruder screw. These are (1) the unmelted plastic or solid bed, (2) a thin melt film between the solid bed and the barrel, and (3) a melt pool where melted material collects.

The term "solid bed" refers to the plastic material prior to a transformation into a substantially less viscous melt material. The solid bed generally remains intact up to a point within a compression section of the screw where it will rupture. The later the solid-bed breakup within the compression section, the more desirable is the screw design. As portions of the solid bed are broken off from the initial mass, the portions flow downstream of the screw and continue to melt. Then as the helical flight of the extruder screw advances, the flight wipes off the melt and forms a melt pool on the downstream side of each section of a channel formed by the turns of the flight.

At some location in the compression section, the solid bed breaks up into large portions. The location and size of the portions are a function of screw design and operating conditions. As the solid bed heats up, the plastic is transformed into a very viscous melt surrounded by less viscous melt. The more viscous melt may resist mixing and transformation into a less viscous form thereby detracting from the homogeniety and thermal exposure of the mix.

Improved mixing and temperature distribution have been achieved by using extruders having increased barrel length to diameter ratios. The evolution of extruder screw designs is discussed in U.S. Pat. No. 3,762,693 issued in the names of R. V. DeBoo and C. B. Heard, Jr., incorporated by reference hereinto. Terms such as "mixing", "dispersing" and "flight diameters" are terms well known in the art and are defined, for example, in U.S. Pat. Nos. 3,530,534 and 3,762,693.

Slotted ring design screws with pins extending into the channel in a metering section to cause a previously broken solid bed to further break up and thereby increase conduction heat melting are exemplified by U.S. Pat. No. 3,486,193. This design is characterized by a broken flight to permit mounting the pins continuously around the root diameter section of the screw within the metering section. This causes undesirable "dead spaces" which tend to cause a backup of the thermoplastic material.

In U.S. Pat. No. 3,487,503, a multiplicity of pins are arranged crosswise or lengthwise of the channel in any region such as the metering or compression sections in which the material is received in a molten or plastic condition to achieve efficient mixing of the thermoplastic material within the extruder resulting in greater uniformity in the extrudate. Although some of the pins in any one turn of the flight of the screw lie in a plane which may be perpendicular to the axis of the screw, other ones of the pins in that turn of the flight lie outside the plane. Pins arranged in this manner have been found to introduce excessive restrictions to flow thereby necessitating increases in the RPM of the extruder screw and shear heat which are critical for control of temperature and hence expansion of the blowing agent.

A uniform solid insulation extrudate has been achieved by using a pin arrangement as disclosed in U.S. Pat. No. 3,762,693, referred to hereinbefore, where the metering section of the screw is provided with at least one group of pins, all of the pins in any one group lying in a plane perpendicular to the axis of rotation of the screw. These pins facilitate further breakup of solid bed which reaches the metering section to provide small portions with increased surface area to increase the effect of conductive heat upon the plastic material.

While the above arrangements, and particularly the last described, have been found suitable for working the usual thermoplastic materials and achieving a uniform extrudate at the die end, problems arise when extruding cellular insulation. There, unlike normal solid insulation, it is desired that the thermal history, and not just the temperatures of corresponding portions of successive sections of the extrudate, be controlled to insure uniformity of expansion. This will minimize fluctuations in the coaxial capacitance of the insulated conductor (hereinafter referred to as "capacitance") and diameter-over-dielectric (hereinafter referred to as "DOD").

Conventional extruder screws provide undesirably a premature as well as an intermittent rather than a continuous fragmenting of the solid bed of thermoplastic material. This presents a problem for thermoplastic materials having a chemical blowing agent priorly introduced thereinto. The blowing agent in the broken solid bed is not exposed to as high a temperature for as long a period of time as the blowing agent in the melt between consecutive pieces of solid bed. A low temperature history of the blowing agent in the solid bed will cause decreased percent expansion. Variations in the percent expansion causes variation, undesirably, in the capacitance and DOD.

Problems encountered in extruding cellular insulation have been recognized. In U.S. Pat. No. 3,287,477, spaced portions of the screw are provided with longitudinal grooves to form "choke" sections. There is still a need for facilities to control both the location of the solid-bed breakup of cellular insulation material and the manner in which it is broken up.

SUMMARY OF THE INVENTION

An apparatus for of advancing and working thermoplastic materials to provide a melt for application to an elongated article includes a channel extending helically about an axis of revolution from a supply end in a downstream direction to an output end. The channel has uninterrupted side boundaries for advancing a thermoplastic material with a portion of the channel decreasing continuously in cross-sectional area in the downstream direction. Means compress and heat the thermoplastic material to progressively melt portions of successive sections of it subjecting the material to forces exerted by force-producing components within the portion of the channel in which the cross-sectional area decreases. Each of the force-producing components in any portion of the channel has a portion thereof lying in a plane which is perpendicular to the axis of revolution. The apparatus continuously fragments unmelted portions of successive sections of the thermoplastic material to provide a melt at the output end, the successive sections of which experience substantially identical thermal histories.

More particularly, extruding expandable thermoplastic materials while controlling the location and manner of solid-bed breakup includes facilities for at least one expandable thermoplastic material into a first zone of an extruder screw having a helical flight formed thereon, and facilities for moving the screw rotatably to feed the material through a channel formed by the flight to a second zone where the material is compressed and heated while it is simultaneously subjected to forces exerted by force-producing components spaced about the surface of the screw and extending into the channel in the compression zone. The components in any one turn of the flight lie in a plane normal of the axis of rotation of the screw, generally directed radially outwardly therefrom, and are non-intersecting with the flight. The pressure in the thermoplastic material is relieved in a third zone of the screw while the material is advanced through the third zone to a fourth zone. The thermoplastic material is advanced through a fourth metering zone to a die. The relative lengths of the zones are sized to control the breakup of the solid bed to be within the second zone and the pins are positioned at the location of solid-bed breakup to cause a controlled manner of breakup.

BRIEF DESCRIPTION OF THE DRAWINGS

Other objects and features of the present invention will be more readily understood from the following detailed description of specific embodiments thereof when read in conjunction with the accompanying drawings, in which.

DETAILED DESCRIPTION

Figure 1:
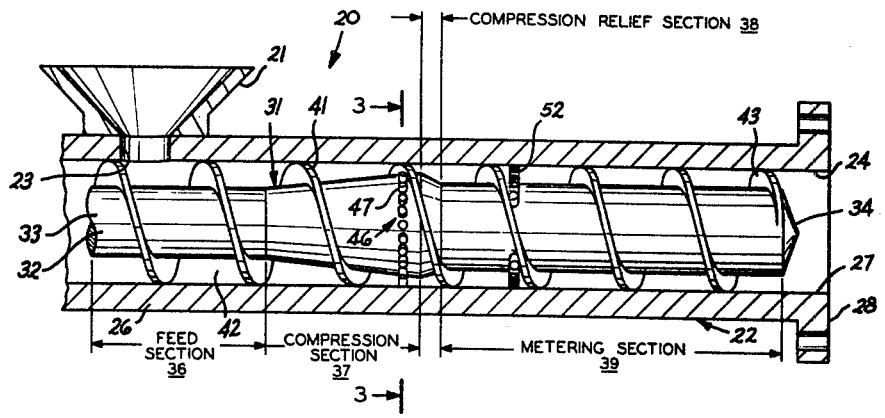
FIG. 1 is an elevation view, partially in section, of a conventional compression relief design extruder screw modified in accordance with the principles of this invention.

Referring now to FIG. 1, there is shown an extrusion apparatus, designated generally by the numeral 20, which includes a hopper 21 into which at least one thermoplastic material in the form of pellets having a chemical blowing agent dispersed therein is fed. The hopper 21 communicates with an extrusion cylinder designated 22. Thermoplastic materials are advanced from an inlet or receiving end 23 of the cylinder 22 to an outlet or delivery end 24 thereof where the extrudate is formed into a covering on a cable core (not shown) being advanced continuously through an extruder head (not shown) adjacent the delivery end.

As can best be seen in FIG. 1, the extrusion cylinder includes a barrel or casing 26 having an internal surface of revolution in the form of a cylindrical bore 27 of uniform diameter formed therethrough and connecting the receiving end 23 to the delivery end 24. The extrusion cylinder 22 also includes a flange 28 at the delivery end 24 thereof which facilitates the attachment of adapters, dies and other auxiliary equipment (none of which are shown but which are well known in the art).

In order to advance the thermoplastic material from the hopper 21 to the delivery end 24 of the extruder 20, an extruder screw, designated generally by the numeral 31, is disposed concentrically within the bore 27. The extruder screw 31 includes a core 32, has an upstream end 33 thereof adjacent the hopper 21, and a downstream end 34 adjacent the delivery end 24.

The extruder screw 31 is of a design commonly referred to as a compression relief design. Beginning at the upstream end 33 thereof, the extruder screw 31 includes, successively, a first constant root diameter section 36 of the core 32 referred to as a feed section (see FIG. 1), a uniformly increasing root diameter section 37, referred to as a compression section, a uniformly decreasing root diameter section 38, referred to as a compression relief section, and a uniform diameter root section 39, commonly referred to as the metering section.

The extrusion screw 31 is manufactured to have a thread or flight 41 formed helically about and extending longitudinally along the core 32. The flight 41 is formed to provide a groove or channel 42 formed by the root diameter surface of the core 32 and facing side walls 43—43 of the flight. The external diameter and pitches of the flight 41 are generally identical and constant along the length of the extruder screw 31 from a point just beyond the entrance end 33 of the screw to the delivery end 34 thereof. However, if desired, the pitch of the flight 41 may be made to decrease slightly from the portion of the screw adjacent the receiving end 23 of the bore 27 to the delivery end 24 thereof. The leading face of the flight 41 is substantially perpendicular to the root diameter surface of the core 32 to provide for an improved delivery action.

The channel 42 formed between the opposing walls of the flight 41 and the surface of the core 32 is generally rectangular in shape. It should be clear that the area of the channel 42 is constant from the receiving end 33 to the beginning of the compression section 37. Then the area of the channel 42 decreases to the compression relief section 38 whereat the area increases for a short distance, e.g., typically one-half turn and then remains constant throughout the metering section 39. A compression relief section is not required to practice this invention. In a typical compression relief screw, the compression relief section may extend, for example, one-half turn.

It is known that high output extruders are required for solid insulation however; for foam or cellular insulation, the output requirement is decreased. If the same extruder is used for cellular insulation, the plastic material is moved more slowly through the extruder and there is increased time for heating by conduction as opposed to shear heating.

Figure 4:
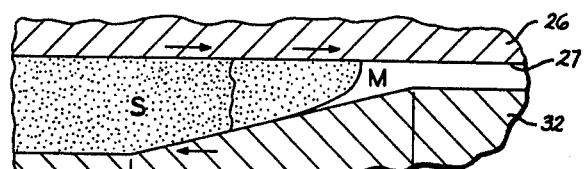
FIGS. 4 and 5 are enlarged elevational views in the vicinity of the compression section and showing a sequence of breaking up of what is referred to as the solid bed.

The extruder barrel 22 tends to move the solid bed in a down channel direction (see FIG. 4). This is resisted by the screw 31 which is tapering. At the beginning of the compression section 37, the solid bed is supported by the bottom of the channel 42.

Figure 5:
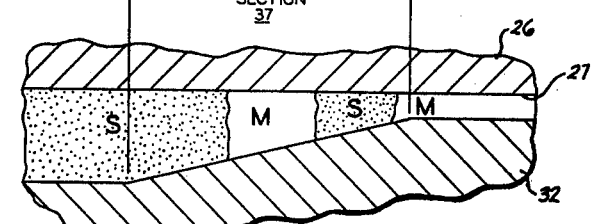

The plastic material is observed to melt at a higher rate than the rate at which the channel area is being reduced in the compression section 37 whereas under ideal conditions, the rates should be substantially equal. This unexpectedly causes a melt pool to collect under the solid bed adjacent the downstream end of the compression section 37 (see FIG. 4) adjacent the core 32 and undermines the solid bed. A portion of the solid bed breaks off and tends to jam adjacent the shallow end of compression section 37 (FIG. 5) with melt collecting between the solid bed and the broken off portion.

Premature, intermittent breakup of the solid bed (FIGS. 5 and 6) is undesirable in extruding cellular insulation. If further breakup is delayed to the metering section 39, the blowing agent in sections of the material across the channel and including large fragments will not experience the same temperature profile in its advance along the channel 42 as will the blowing agent in sections which do not include the large fragments. This causes a high amplitude of variation in the capacitance and DOD.

It is desirable to control the breakup of the solid bed to fragment continuously the unmelted portions of the successive sections of the thermoplastic material at a predetermined location. Then at any point along the channel, corresponding portions of successive sections of the thermoplastic material advanced therepast are at the same temperature. The temperature along the channel varies thus imparting to each portion of each successive section a time-temperature profile, or what is commonly referred to as thermal history. Of course, it should be understood that the temperature of portions within the section transverse of the channel can also vary.

Then although the blowing agent in each section or slice of the thermoplastic material across the channel 42 may be exposed to a varying thermal history because of the distribution of fragments of the solid bed therein (FIG. 7), the thermal history of the blowing agent in corresponding portions of successive sections of the melt at the output end does not vary. Of course, the melt temperature at the output end is substantially constant. This results in a cellular insulated conductor (not shown) with generally constant percent expansion.

In extruding cellular insulation, the tapering of the compression section 37 is made to correspond with the melting rate by using a shorter feed and compression section 37.

The general shortening of the feed and compression sections 36 and 37, respectively, effectively controls the location of the solid-bed breakup to be desirably in the vicinity of the downstream end of the compression section. The extruder screw 31 may be still further modified to control the manner in which the solid bed breaks up, e.g., the size and shape of the broken off portions. This will further insure a substantial uniform thermal history of successive sections of the extrudate at the output end of the extruder 20.

It has been found that force-producing components advantageously positioned at the controlled location of solid-bed breakup cause desirably the breakup to be in relatively small portions as compared to the larger portions experienced in the past. A breakup into small chunks improves the conduction melting thereof because of the larger surface area exposed to the melt and advantageously decreases the amplitude of variation in capacitance and/or DOD.

The force-producing components may be constructed similar to those described in the DeBoo-Heard U.S. Pat. No. 3,762,693. However, the components are positioned at the point at which the solid-bed breakup is controlled to occur.

The location of the solid-bed breakup can be determined by so-called cooling experiments as described in "Plastic Extrusion — Part I" by R. C. Donovan and D. I. Marhsall and "Plastic Extrusion — Part II" by E. S. Decker, T. S. Dougherty and C. B. Heard published on pages 74–85 (all incorporated by reference hereinto), of the July-October 1971 issue of *The Western Electric Engineer*. A colorant is introduced into the thermoplastic material and the extruder is operated. After a steady state condition is reached, the operation is discontinued and cooled and the thermoplastic material from the channel 42 removed as a continuous sheet and cut transversely into slices. The point along the channel at which the cross-sectional slice changes color substantially completely to that of the colorant is essentially the point of solid-bed breakup.

Figure 2:
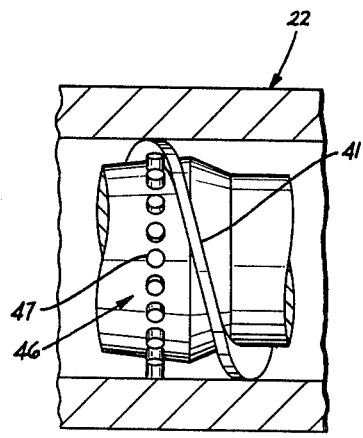
FIG. 2 is an enlarged fragmentary detail view of a portion of the extruder screw of FIG. 1 and showing a group of pins connected to a core of the screw in a compression section thereof.
Figure 3:
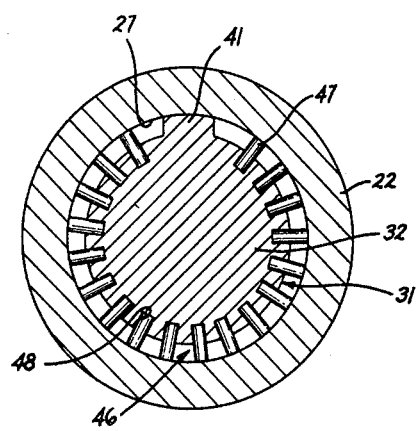
FIG. 3 is an enlarged sectional view of the extruder screw and associated barrel of FIG. 1 taken along lines 3—3 showing a plurality of pins directed outwardly radially from a longitudinal axis of the screw and lying substantially in a plane perpendicular to the axis, the flight of the screw being uninterrupted in the section of the screw containing the pins.

In order to insure that successive sections of the extrudate have experienced substantially the same thermal history, at least the compression section 37 of the extruder screw 31 is provided with facilities, designated generally by the numeral 46, for subjecting the materials to a plurality of forces (see FIG. 2). The force-producing components are preferably attached to the screw 31 approximately one to four turns upstream of the downstream end of the compression section 37.

As can best be seen in FIG. 2, the facilities 46 include a plurality of force-producing components 47—47 in the form of pins which are mounted individually in holes 48—48 formed in the core 32 of the extruder screw 31 at least along the compression section of the screws. The holes 48—48 are formed so that the centers thereof lie substantially in a plane which is perpendicular to a longitudinal axis of rotation of the core 32. Additionally, the holes 48—48 are formed in the core 32 so that when the pins 47—47 are mounted in the associated ones of the holes, the pins are directed radially outward from the longitudinal axis of the core 32.

It should be observed that the arrangement of pins 47—47 differs from some prior art arrangements in that all of the pins 47—47 in any one turn of the flight 41 have at least some portion of the axes thereof or of the pins themselves lying in the so-called plane of pins which is perpendicular to the axis of rotation of the screw.

The structural arrangement of the pins 47—47 with respect to the flight 41 is established to minimize the "dead spaces" which appear to occur in the so-calfed slotted ring designs. In order to accomplish this, the flight 41 of the extruder screw 31 is uninterrupted at least in that portion of the screw whereat the pins 47—47 are located. The walls 43—43 of the flight 41 of the screw 31 are formed by surfaces which intersect with the plane containing the pins 47—47 such that the surfaces are continuous through the plane.

Alternatively, pins 49—49 may be arranged in a row crosswise of the channel as disclosed in U.S. Pat. No. 3,487,503 (see also FIG. 8). However, this disadvantageously reduces significantly the channel area. In the preferred design, at any one point, the channel is reduced only by the width of one pin and hence holds the pressure drop to a minimum. Pins arranged transverse of the channel causes a higher pressure drop, thus necessitating a higher screw speed. Excessive screw speed leads undesirably to excessive shear heat and increases the difficulty in controlling the melt temperature and hence the degree of expansion of the extrudate.

Figures 6, 7, 8:
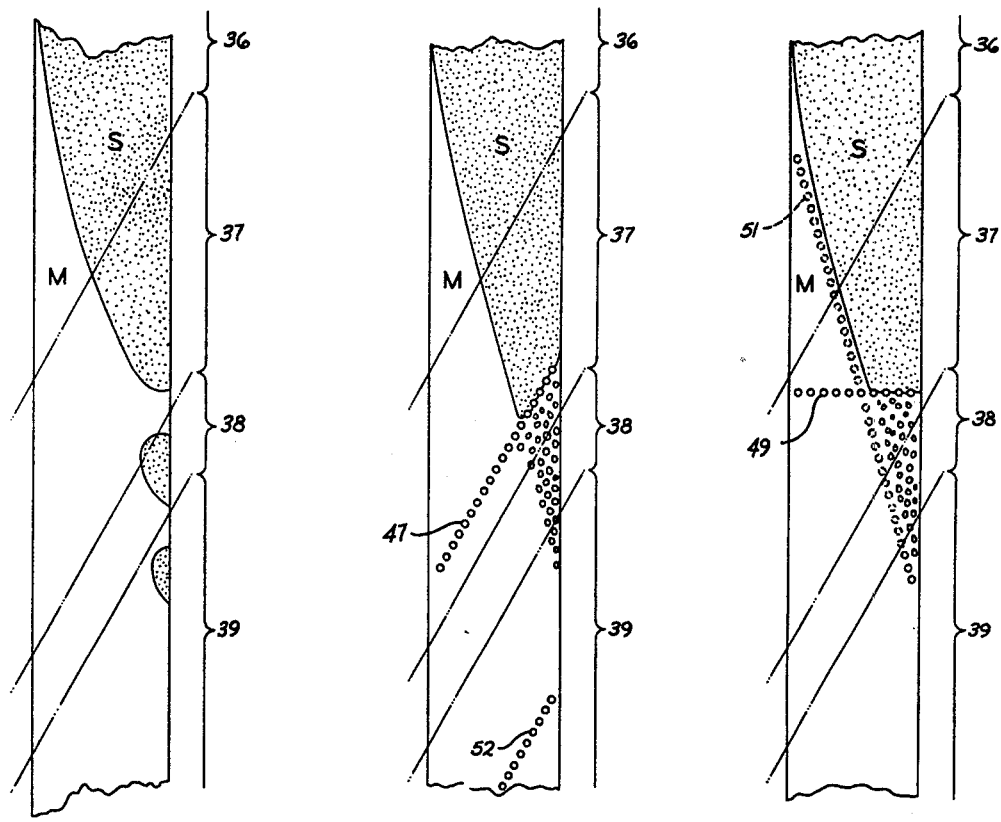
FIG. 6 shows a plan view of the helical channel of the extruder screw unwrapped therefrom and showing areas of melt and solid materials.
FIG. 7 shows the unwrapped channel of FIG. 6 with the force-producing components of this invention superimposed thereon and showing the effect of these components.
FIG. 8 shows embodiments of alternative arrangements of force-producing components.

A still further alternative is to determine where the solid bed-melt interface occurs by the aforementioned cooling experiments and at that location to install a row of the pins 51—51 (see FIG. 8). This would involve many turns of the screw 31 and require a substantially larger number of the pins 47—47.

While the above described invention was made in order to overcome problems in the extrusion of cellular insulation, it has been found surprisingly that the principles of this invention may be used advantageously in the extrusion of solid insulation materials. The prior art has generally not used force-producing components in the compression section of the screw 31 because the melting of the plastic material occurs there.

However, it has been found that the use of the pins 47—47 in the compression section preferably supplemented by pins 52—52 in the metering section produces a homogeneous extrudate with each section having substantially the same thermal history. This is particularly ture with respect to high output extruders where because of the rate of output, the use of pins in the metering section 39 alone may not provide breakup into smaller portions early enough to expose the portion to conductive heat as to achieve uniform temperatures of the extrudate at the die (not shown).

The use of the pins 47—47 in the compression section 37 insures a timely fragmenting of the solid bed and provides ample time for exposure to conductive heat. This overcomes problems of shrinkage and undesired bubble formation in the extrusion of some materials such as polypropylene and high density polyethylene.

Of course, the number of pins 47—47, their precise location, diameter and spacing may vary according to a particular application of the extruder 20, the melt temperature, type of plastic shape extruded, type of materials fed to the extruder, diameter of the screw 31, and other variables, The number of groups of pins, by the degree of responsiveness of heating and mixing.

The holes 48—48 may be drilled to a diameter requiring press fitting of the pins 47—47. The pins 47—47 may be positively anchored in the core 33 by, prior to the insertions thereof, placing solder powder and flux in the associated hole 48 and thereafter pressing the pin into the hole and applying heat to the pin and adjacent core area until bonding has taken place. The pins 47—47 are ordinarily oversized with respect to length and the outer end surfaces ground, machined or otherwise trimmed to a contour conformity with the surface of revolution swept by the flight 41. Of course, the pins 47—47 can be connected to the core 32 in any feasible manner which does not otherwise disrupt the cross-sectional area of the channel 42. The pins may be cylindrical, and typically are three-sixteenths inch diameter with the centers of the holes 48—48 thereof spaced apart with a gap of at least three-sixteenths inch on a circumferential circle about the core 32. The pins 47—47 extend into the predetermined path of the thermoplastic materials along the channel 42 with the height of the flight 41.

All of the pins 47—47 need only have a portion thereof in the associated plane. The pins 47—47, instead of lying substantially in the plane with the pins directed radially outward, could project transversely out of the plane where it intersects the flight 41. Or the pins 47—47 could be included in the plane but not necessarily be directed radially outward from the axis of rotation of the core 32. And finally, it is within the scope of this invention that the force-producing components need not be in the form of pins but could be in the form of vanes such as is common in impeller wheels.

It may also be important to the operation of the extruder apparatus 20 in a particular application to have a specified ratio of the circumferential area of the core 32 of the screw 31 between the pins to the total area of the free ends of the pins 47—47 in any one plane. The extruder screw 31 which embodies the principles of this invention could have the pins 47—47 arranged so that this ratio lies in the range of 0 to 1.

Additional planes of pins 47—47 may be used in the metering section with the upstream one of the planes being located one-half turn or one-half pitch downstream of the compression relief section 38 of the screw 31. Alternatively, the upstream one of the planes is three-sixteenths inch downstream of the compression relief section. The downstream one of the planes is positioned at the downstream end of the screw 31 with the other two planes spaced uniformly between the other two planes.

OPERATION

Thermoplastic material, such as polyethylene, polymerized vinyl chloride or the like in granular, powder or pellet form with suitable fillers and/or pigments and blowing agent suc as azo-di-carbonamide is introduced into the hopper 21 of the extruder 20. The extrusion screw 31 advances the thermoplastic material from left to right, as viewed in FIG. 1, through the channel 42 between the walls of the flight 41.

In one typical arrangement, the extrusion apparatus 20 includes a screw 31 having a barrel diameter of 2½ inches and length of 66 inches. The feed section 36 extends for thirteen inches and has a depth of 375 mils. The compression and compression relief sections 37 and 38, respectively, extend for fifteen and approximately two inches respectively and have minimum depths of 100 mils. Finally, the metering section extends for 36 inches and has a uniform depth of 145 mils.

The general direction of the melting material relative to the screw 31 is lengthwise of the helical channel 42. For purposes of explanation, the channel 42 may be regarded as having a helical axis extending lengthwise of the channel midway between adjacent turns of the flight 41. In addition to this movement, the material flows transversely and in a curvilinear fashion about the axis. Each minute element of material traverses a path which is a helix having convolutions centered about the axis which is also a helix. This movement is generated by the frictional engagement of the inner barrel surface 27 with the outer surface of the plastic material. Because of heat transmission at the interface of the screw flight 41 and the surface of revolution resulting from frictional heating, or by heating or cooling equipment, a temperature gradient normally exists which varies outwardly from the axis to the interface.

As the thermoplastic material is advanced into the compression section 37, compacting, softening, melting and mixing takes place therein as the cross section of the channel 42 decreases. The material in the compression section 37 tends to be drawn out with a change in velocity. Also, and as can be seen in FIG. 7 the pins 47—47 fragment continuously the solid bed into small portions, unlike the intermittent breakup shown in FIG. 6. This desirably exposes the blowing agent in corresponding portions of successive sections of the melt to substantially the same temperature profile along the length of the channel and minimizes fluctuations in capacitance and DOD.

As the material is advanced through the plane of pins 47—47 in the compression section 37, the pins penetrate the material in the channel 42 to disrupt the normal cross section currents of the material and cause breakup of the material.

Then when the material enters the compression relief section 38, the material tends to be retracted somewhat with accompanying change in velocity. The metering section 39 functions to tend to bring about further uniformity throughout the material advanced therethrough with respect to the temperature, composition and coloring.

The pins 52—52 which may be used in the metering section 39 cause a mixing of the plastic material and tend to overcome the tendency of themelt to migrate upstream to the leading or pushing face of the flight 41. The melt is urged toward the trailing faces of the flight to mix the melt with the solids and achieve a homogeneous extrudate. By using the pins 47—47 in the compression section supplemented by those in the metering section, a high degree of thermal uniformity of the extrudate is obtained.

It should be observed that in the past, achievement of thermal uniformity of an acceptable degree was obtained principally through a reduction of the depth of the channel 42 within the metering section 39. This had the unfortunate corollary effect of reducing the delivery capability of the extruder 20 and was inadequate to break up effectively the solid bed to promote uniformity in thermal history of substantially all of the extrudate.

It should be realized that an additional benefit of this invention accrues in that presently used screws may be modified as to relative section length changes and to include the pins 47—47. This permits the continued use of present investment in plant and at the same time being able to increase the effectiveness of the present equipment in producing dual insulated conductors and jackets.

The following four examples relate to the production of 22 gauge dual insulated conductor having a two mil skin of solid high density polyethylene extruded over an eight mil wall of 45% expanded high density polyethylene (Allowable variation: DOD ± 1 mil, cap. ± 1.5 pf/ft).

EXAMPLE I

Prior Art Screw

The screw 31 included an 18 inch long feed section 36 having a depth of 0.425 inch a 24 inch long compression section 37 having a depth at the shallow end thereof of 0.110 inch and a metering section 39 approximately 23 inches at a depth of 0.110 inch. The depth dimension refers to the distance from the top of the flight 41 to the bottom of the channel 42. The application of the expandable insulation was accomplished at a line speed of 3000 fpm, 39 RPM, a head pressure of 4200 lbs./sq. in., and barrel temperatures ranging from 325° F at the beginning of the feed section to 410° F at the head. The melt temperature was 433° F. The variation in DOD was found to be ± 0.2 mils from nominal and the variation in capacitance was found to be ± 1.5 pf/ft.

EXAMPLE II

Prior Art Screw

The screw 31 included a 13 inch long feed section 36 having a depth of 0.375 inch., a 15 inch long compression section 37 having a depth of 0.100 inch at the shallow end, a 1.25 inch long relief section 38 and a metering section 39 approximately 36 inches in length and having a depth of 0.145 inch. The expandable insulation was applied at a line speed of 5000 fpm, at 56 RPM screw speed, a head pressure of 5700 lbs./sq. in. and barrel temperatures ranging from 400° F at the beginning of the feed section 36 to 400° F at the head with a melt temperature fo 445° F. The variation in DOD was ± 0.2 mils, and in capacitance, ± 1.5 pf/ft from nominal values.

EXAMPLE III

Pins in Metering Section

It should be noted that the screw 31 of EXample II was first modified with only a ring of the pins 52—52 in the metering section 39 and no pins in the compression section 37. No significant changes in the DOD and capacitance variations over those recorded for Example II were observed.

EXAMPLE IV

Pins in Compression and Metering Section

The screw 31 of Example II was modified to include a ring of the pins 47—47, each 3/16 inch in diameter on ⅜ inch centers approximately 25½ inches from the upstream end of the feed section 36 and a ring of the pins 52—52 in the metering section 39 approximately 31 inches from the upstream end of the feed section. The pins in the metering section 39 also were 3/16 inch in diameter on ⅜ inch centers measured circumferentially along the core surface. The expandable insulation layer was applied at a line speed of 5000 fpm, 59 RPM screw speed, a head pressure of 5750 lbs./sq. in. and a constant barrel temperature of 395° C and a melt temperature of 440° F. The variations in DOD and capacitance surprisingly were found to be only ± 0.2 mils and ± 0.4 pf/ft, respectively. The height of the pins 47—47 was slightly less than the distance from the core surface at the bottom of the channel 42 to the top of the flight 41.

The following example relates to the production of 20 gauge aluminum insulated with a 2 mil skin of solid high density polyethylene over a 10 mil covering of high density polyethylene having a 45% expansion.

EXAMPLE V

The screw 31 included a 24.5 inch long feed section 36 having a depth of 0.400 inch, a compression section 31.5 inches long and a depth of 0.100 inch at the downstream end thereof, a 1.75 inch long compression relief section 38 and a metering section 39 having a length of 33.625 inches and a depth of 0.135 inch. A ring of 3/16 inch diameter pins spaced apart 3/16 inch were connected to the screw 31 at a distance of 42 inches from the beginning of the feed section. The expandable insulation was applied at a line speed of 4000 fpm, a screw speed of 31 RPM and barrel temperatures ranging from 225° F in the feed section to 395° F in the head. The variations in DOD and capacitance were found to be ± 0.2 mil and ± 0.5 pf/ft.

It is to be understood that the above-described arrangements are simply illustrative of the principles of the invention. Other arrangements may be devised by those skilled in the art which will embody the principles of the invention and fall within the spirit and scope thereof.

What is claimed is:

1. An apparatus for extruding expandable thermoplastic materials, which comprises:

means for compressing and heating an expandable thermoplastic material to progressively melt portions of successive sections of the expandable thermoplastic material, said means including a core having a channel formed by an uninterrupted helical flight extending about an axis of rotation of the core in a downstream direction from a supply end to an output end with a compression section of the channel which decreases in cross-sectional area continuously in the downstream direction, said compression section being such as to cause unmelted portions of the expandable thermoplastic material to fragment at a predetermined location along its length;

a plurality of pins connected to the core at the predetermined location within the compression section for subjecting the thermoplastic material to forces with each of the pins having at least some portion thereof lying in a plane which is perpendicular to the axis of rotation and with the flight being continuous through the plane to cause the fragmentation of the unmelted portions of successive sections of the thermoplastic material to be continuous; and means for moving rotatably the core to advance the thermoplastic material along the channel to provide a melt at the output end with corresponding portions of successive sections having substantially identical thermal histories.

2. The apparatus of claim 1, which also includes at least one plurality of force-producing components in a portion of the channel downstream of the portion of the channel along which the cross-sectional area decreases continuously.

3. An apparatus for extruding expandable thermoplastic materials, which comprises:

a housing having a longitudinally extending cylindrical bore formed therein;

an extrusion screw fitting closely within the bore and having a channel which extends substantially from one end to the other end of the screw and which is formed by walls of an uninterrupted flight that is generated helically about an axis of rotation of the screw with one end of the screw being a receiving end and the other end being a delivery end for advancing a thermoplastic material from the receiving end of the screw to the delivery end thereof and for homogenizing the material;

the screw being formed successively from the receiving end to the delivery end with a feed section, a compression section, a compression relief section, and a metering section wherein the relative lengths of the sections and diameter of the screw and the relative channel depths in the sections of the screw are such that portions of successive sections of the thermoplastic material are caused to progressively melt beginning generally at the downstream end of the feed section and unmelted portions of successive sections of the thermoplastic material are fragmented at a predetermined location within the compression section; and a plurality of pins in the channel in the compression section at the predetermined location and arranged about the circumference of the screw for subjecting the thermoplastic materials to a plurality of forces with all the pins in any one turn of the channel having at least an integral portion thereof disposed in one plane which is perpendicular to the axis of rotation of the screw and with the walls of the channel being uninterrupted and continuous through the plane, the control of the location of the fragmentation and the engagement of the thermoplastic material with the pins being effective to cause the fragmentation to be continuous to provide an extrudate, the successive sections of which have experienced substantially identical thermal histories.

* * * * *